US011188045B2

(12) United States Patent
Reddy

(10) Patent No.: US 11,188,045 B2
(45) Date of Patent: Nov. 30, 2021

(54) ENERGY MANAGEMENT SYSTEM WITH GENSETS AND ENERGY STORAGE

(71) Applicant: Caterpillar Inc., Deerfield, IL (US)

(72) Inventor: Suresh B. Reddy, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 445 days.

(21) Appl. No.: 16/356,791

(22) Filed: Mar. 18, 2019

(65) Prior Publication Data

US 2020/0301383 A1    Sep. 24, 2020

(51) Int. Cl.
*G05B 19/042* (2006.01)
*H02J 13/00* (2006.01)
*H02J 3/38* (2006.01)

(52) U.S. Cl.
CPC ............ *G05B 19/042* (2013.01); *H02J 3/381* (2013.01); *H02J 13/0006* (2013.01); *G05B 2219/2639* (2013.01)

(58) Field of Classification Search
CPC .......... G05B 19/042; G05B 2219/2639; H02J 3/381; H02J 13/006
See application file for complete search history.

(56) References Cited

U.S. PATENT DOCUMENTS

| 8,346,416 | B2 | 1/2013 | Liu et al. |
| 9,197,071 | B2 | 11/2015 | Williams |
| 9,367,108 | B2 † | 6/2016 | Asghari |
| 9,489,701 | B2 † | 11/2016 | Emadi |
| 2013/0204443 | A1* | 8/2013 | Steven ................ H02J 3/28 700/286 |
| 2014/0277599 | A1* | 9/2014 | Pande .............. H02J 13/00016 700/22 |
| 2015/0097437 | A1 | 4/2015 | Votoupal et al. |

(Continued)

FOREIGN PATENT DOCUMENTS

| CN | 101716931 A | 6/2010 |
| GB | 2527806 A | 1/2016 |
| WO | WO 2017041752 A1 | 3/2017 |

OTHER PUBLICATIONS

Peter Ozaveshe Oviroh et al., "The Energy Cost Analysis of Hybrid Systems and Diesel Generators in Powering Selected Base Tranceiver Station Locations in Nigeria", MPDI, Mar. 19, 2018 (20 pages).†

(Continued)

*Primary Examiner* — Ronald D Hartman, Jr.
(74) *Attorney, Agent, or Firm* — von Briesen & Roper, s.c.

(57) ABSTRACT

A micro-grid system for providing power to a load includes a plurality of gensets and energy storage units (ESU) in parallel. An asset management controller is configured to determine a genset cost function for the gensets based on at least an efficient load factor, and determine an ESU cost function based on at least the a discharge power loss (DPL) and a charge power loss (CPL). The AMC assigns a priority to each ESU and each genset based on the cost function and selectively activates the power supplies based on the priority and a power demand of the load and a reserve. The AMC determines an available reserve among activated power supplies then selectively distributes the load among activated power supplies and reserve among the available reserve.

20 Claims, 8 Drawing Sheets

(56) References Cited

U.S. PATENT DOCUMENTS

| | | | | |
|---|---|---|---|---|
| 2015/0207323 A1* | 7/2015 | Baba | ............... | H02J 3/383 |
| | | | | 307/20 |
| 2016/0159239 A1 | 6/2016 | Shi et al. | | |
| 2016/0377306 A1* | 12/2016 | Drees | ............... | H02J 15/00 |
| | | | | 700/295 |
| 2017/0104337 A1* | 4/2017 | Drees | ............... | H02S 40/32 |
| 2017/0285111 A1* | 10/2017 | Fife | ............... | H02J 3/46 |
| 2018/0254632 A1* | 9/2018 | Elbsat | ............... | G06Q 50/06 |
| 2019/0137956 A1* | 5/2019 | Hooshmand | ............... | H02J 7/34 |
| 2020/0059098 A1* | 2/2020 | Dong | ............... | G06Q 30/02 |

OTHER PUBLICATIONS

Nikitas Zagoras, "Battery Energy Storage System (BESS): A Cost/Benefit Analysis for a PV power station", Clemson University, Sep. 2014 (16 pages).†
Caterpillar, "Marine Engine 3406E", Caterpillar Inc., 1996 (6 pages).†
Ali Saleh Aziz et al., "Energy Management and Optimization of a PV/Diesel/Battery Hybrid Energy System Using a Combined Dispatch Strategy", MPDI, Jan. 1, 2019 (26 pages).†
Qingfeng Tang, et al., "Optimal Operation Method for Microgrid with Wind/PV/Diesel Generator/Battery and Desalination", Hindawi, Jun. 16, 2014 (13 pages).†

* cited by examiner
† cited by third party

ENERGY MANAGEMENT SYSTEM WITH GENSETS AND ENERGY STORAGE

TECHNICAL FIELD

The present disclosure relates generally to micro-grid systems and, more particularly, relates to systems and methods for reducing operating costs of micro-grid systems involving gensets and energy storage units.

BACKGROUND

For off-grid application sites, such as remote villages, islands, remote mining sites, remote military installations, land or offshore drilling rigs, on-board ships, and the like, reliable power supplies are needed. A micro-grid system is a small electrical grid having a plurality of electricity generating devices that may be configured to service a localized power load. Hybrid systems containing may include a plurality of combustion engine-driven generator in parallel (gensets) and battery banks provide a continuous power supply without disruption to the power load. Energy storage, such as batteries banks, are typically connected to the micro-grids to account for transients or spikes in energy consumption. However, in these hybrid systems, refueling, maintenance, and battery replacement costs become significant over time.

In order to reduce such costs, it is well known that the fuel efficiency of a genset increases when the genset is run closer to a full load capacity, that is, the fuel efficiency increases at higher load factors. It is also well known to prolong the lifetime of the energy storage units is it is important to monitor state of charge (SOC), state of health (SOH), temperature, voltage, and current of each unit. However, to maintain peak efficiency and lower overall operating cost during the lifetime of the equipment, it is not enough just to monitor the load and distribute the load according to rated operating conditions.

An attempt to improve micro-grid efficiencies has been proposed in U.S. 2016/0118799 A1 by Seww Energy Inc. (hereinafter "Seww"). Seww proposes a microgrid system that provides reliable hybrid power from solar, wind, battery sources as well as diesel fuel generators to stabilize the power quality to reduce risk of damaging sensitive medical equipment. Seww also proposes that the diesel generators can be turned off periodically to conserve fuel. Seww goes on the propose a Microgrid Assessment Tool (MAT) that may be used to capture granular load profiles to generate a feasibility report. The Seww microgrid system relies on the generator's minimum loading ratio (MLR) to benchmark the systems operating efficiency. However, Seww doesn't incorporate monitoring inefficiencies of energy storage units which can reduce operating costs, improve fuel efficiency, and also extend the overall useable lifetime of the equipment.

The disclosed method and system for a micro-grid system is directed to overcoming one or more of the problems set forth above.

SUMMARY OF THE DISCLOSURE

In accordance with one aspect of the disclosure, a micro-grid system is provided. The microgrid system includes a plurality of power sources each configured to selectively supply power to a common bus. The plurality of power sources includes at least one genset and at least on energy storage unit (ESU). The micro-grid system includes an asset management controller (AMC) which is operatively coupled to the plurality of power sources. The AMC is configured to determine a discharge power loss (DPL) between the at least one ESU and a load connected to the common bus, and the AMC is configured to determine a charge power loss (CPL) between the at least one ESU and the at least one genset. The AMC is also configured to genset cost function associated with the at least one genset based on at least an efficient load factor; and determine an ESU cost function associated with the at least one ESU that is based on at least the DPL and CPL. The AMC assigns a priority to the least one ESU and at least one genset based on the corresponding cost function. The AMC is configured to selectively activate power sources based on the determined priority and distribute a power demand of the load connected to the common buss to the activated power sources.

In accordance with another aspect of the disclosure, a micro-grid system is provided. The micro-grid system includes a plurality of power sources each configured to selectively supply power to a common bus. The plurality of power sources include a plurality of ESU's and a plurality of gensets each connected to the common bus in parallel. The micro-grid system includes an AMC operatively connected to each of the plurality power sources. The AMC is configured to determine a DPL between each ESU and a load connected to the common bus, and the AMC is configured to determine a CPL between each ESU and each genset. The AMC determines an ESU cost function for each ESU and a genset cost function for each genset. The storage cost function for each ESU is based on at least the corresponding DPL and CPL; and the genset cost function for each genset is based on at least an efficient load factor. The AMC assigns a priority to each ESU within a cascade of ESU's and to each genset within a cascade of gensets based on the corresponding cost function. The AMC selectively activates power sources based on the determined priority and a power demand of the load and the reserve. The AMC distributes the load demand among the active power sources; determines an available reserve power among the activated power sources as information available to the operator managing loads; and apportions a power demand of the reserve to the available reserve power among activated power sources.

In accordance with a further aspect of the disclosure, a method for operating a micro-grid system is provided. The micro-grid system including at plurality of power sources each configured to selectively supply power to a common bus, the plurality of power sources including at least one ESU and at least on genset. The method includes determining a DPL between the at least one ESU and a load connected to the common bus, determining a CPL between the at least one ESU and the at least one genset. The method includes determining a genset cost function for the at least on genset based on at least an efficient load factor, and determining a storage cost function for the at least one ESU based on at least the DPL, CPL. The method includes assigning a priority to each ESU and genset based on the corresponding cost function, selectively activating power sources based on the determined priority, and distributing a power demand of the load connected to the common bus to the activated power sources and apportion the reserve among the available reserve of activated power sources.

DETAILED DESCRIPTION

Aspects of the disclosure will now be described in detail with reference to the drawings, wherein like reference numbers refer to like elements throughout, unless specified otherwise.

Figure 1:
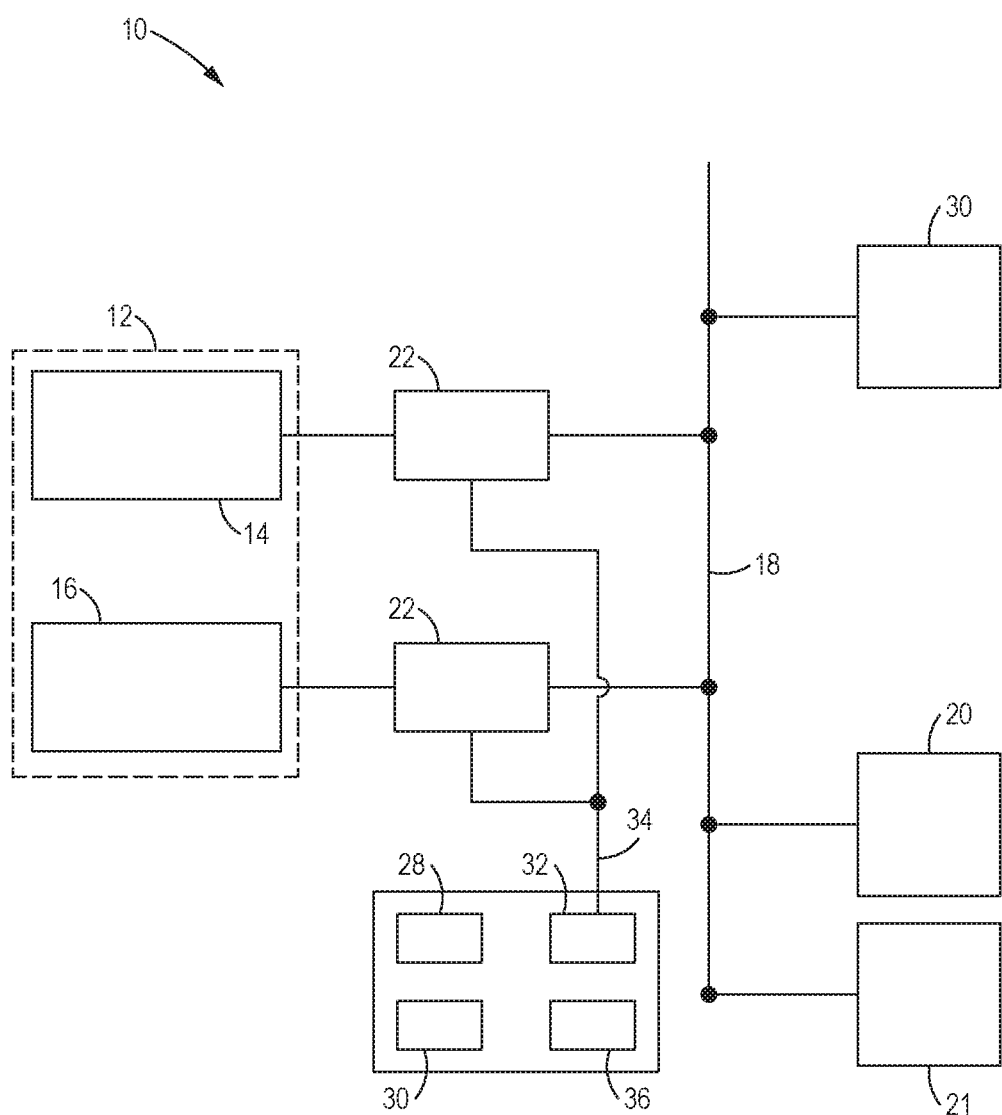
FIG. 1 is a schematic view of a hybrid micro-grid system in accordance with an embodiment of the present disclosure.

The present disclosure provides a micro-grid system having a plurality of power sources, including at least at least one energy storage unit (ESU), at least one genset, and an asset management controller (AMC) configured to service a load on a common bus. The AMC is configured to prioritize the various power sources according to a cost function that accounts for various operational factors associated with each power source. For example, the operational factors for the ESU may include at least power losses during discharge, power losses during charging, type of storage (e.g. battery, ultracapacitor, etc), battery chemistry, a state of charge (SoC), state of health (SoH), number of discharge cycles, depth of discharge, and an optimal SoC range. Operational factors for the at least one genset may include at least an acceptable operating range, optimal operating range, an efficient load factor or range, fuel type and cost, fuel efficiency, emissions output, transient response capability, lifetime usage, number of power cycles, and available spinning reserve. Referring now to FIG. 1, a schematic diagram of a micro-grid system 10 is shown, in accordance with at least some embodiments of the present disclosure. As shown, the micro-grid system 10 may include a plurality of power sources 12 which includes at least at least one energy storage unit (ESU) 14 and at least one genset 16 supplying power to a common bus 18 which services a load 20 and a power reserve 21. In a preferred embodiment, the micro-grid system 10 will include a plurality of ESU's ordered in a cascade of ESU's 14 according to a determined priority and a plurality of gensets ordered in a cascade of gensets 16 according to a determined priority all of which may vary in number, size, type, or capability based on the upon the application, availability, as well as location. For the purpose of this disclosure they will be described as singular entities that can embody sets of the corresponding type of power source 12. It will also be understood that each ESU 14 may also include various components commonly used in micro-grid systems such as, but not limited to, an inverter, inverter controller, and a battery management system as applicable, along with energy storage. Similarly, each genset 16 may also include a genset controller, along with an engine (diesel, gas, or dual fuel), generator, engine and generator controllers.

The micro-grid system 10 may be employed in a variety of applications such as, but not limited to, on islands, remote mining sites, remote villages, land or offshore drilling rigs, military installations, ships, residential neighborhoods, or other off-grid application where a connection to a reliable public utility is not always possible or not desired. As previously stated, the single ESU 14 can embody any combination of diverse energy storage devices. For example, electrochemical units may include various rechargeable battery chemistries, fuel cells, ultra-capacitors, flow batteries, etc.; mechanical storage may include flywheels, hydraulic pumped storage, compressed storage, gravitational potential energy, etc.; thermal storage; and the like. The gensets 16 can embody any combination of rotor-stator combinations driven by a prime mover such as gas, diesel, dynamic gas blending (DGB) combustion engine that can operate at a constant speed or a variable speed. Each power source 14, 16 is associated with a transfer unit 22 that sends power related data from and receives power commands from an asset management controller (AMC) 24. The AMC 24 is also configured to selectively request an amount of power from the power supplies 12 according to a power command from the corresponding power source 14, 16 to the common bus 18. The transfer unit 22 is also configured to adjust that the power output to regulate voltage and frequency to enable the corresponding unit 14, 16 to supply power to the common bus 18. In addition, the transfer units 22 may be configured to monitor and record operational data regarding operational performance to ensure each power source 14, 16 is operating within predetermined operational thresholds. The transfer units 22 also generate and transmit signals associated with recorded operational data in real time to an asset management controller (AMC) 24.

The AMC 24 is configured to compare an actual output of the plurality of power sources 12 to a desired output and selectively control and adjust the power output of each power source 14, 16 to meet the power demand of the load 20 and reserve 21. The controller may include a processor 26 coupled to a memory module 28 which may store one or more programs or software executables to control the operation of the AMC 24 and/or the transfer units 22 to distribute the load 20 and apportion reserve 21 is met or exceeded from among the power sources 14, 16 in accordance with at least one embodiment of the present disclosure. For example, the processor 26 may implement a control strategy that accounts for the predetermined operational thresholds and a corresponding cost function to assign a priority based on marginal cost considerations to reduce the overall operation cost of the micro-grid system 10. The cost consideration may include instantaneous and historical operating costs determined based on corresponding the operation factors of the power source 14, 16. The processor 26 may also compare the overall or aggregate operating cost of the micro-grid system to the cost of meeting the load 20 and reserve 21 demand based on power from a remote or local power utility grid 30. The memory module 28 may include a storage device that stores executable software as well as stores the recorded operational data and related settings defining the operational thresholds. The storage device may include a volatile or non-volatile, magnetic, semiconductor, tape, optical, removable, non-removable, or other type of storage device or computer-readable medium. The transfer unit 22 may also include one or more of a controller which may include an application-specific integrated circuit (ASIC), a field-programmable gate array (FPGA), a computer system, or a logic circuit, configured to allow the transfer unit 22 to function in accordance with the disclosed embodiments. Accordingly, the memory module 28 of the AMC 24 may include, for example, the flash memory of an ASIC, flip-flops in an FPGA, the random access memory of a computer system, a memory circuit contained in a logic circuit, or some combination thereof.

The AMC 24 may also include a communication transceiver 32 which is able to send and receive communication and control signals with the transfer units 22 over a communication bus 34. The communication bus 34 may also be used to communicate data with external computing devices (not shown), such as diagnostic data or the like. The AMC 24 may also include various sensors 36, such as a voltage sensor and current sensor, for sensing voltage and current information from the power sources 14, 16 and the load 20. It should be appreciated that the processor 26 may include one or more commercially available microprocessors, microcontrollers, digital signal processors (DSPs), and other similar devices that may be configured to perform the functions of the processor 26.

The AMC 24 is configured to perform various supervisory control processes or functions. For example, the AMC 24 is configured to determine genset energy consumption costs associated with the at least on genset 16, and determine an ESU energy consumption cost associated with the at least one ESU 14. The genset energy consumption cost can be determined based on at least an efficient load factor which can be determined based on a genset fuel efficiency consumption map as a function of genset load, a fuel consumption map as a function of the genset load, the cost of fuel based on fuel composition and type, and the like. The ESU energy consumption cost can be determined based on at least a return trip efficiency (RTE), a discharge power loss (DPL), a charge power loss (CPL), and a fuel cost associated with its accumulated charge from the at least one genset 16. The genset and ESU energy consumption costs together form an overall energy cost function based on a distribution of the load 20 and an apportion of the reserve 21 among the power sources 14, 16. The AMC 24 is also configured to determine a life cost function for each power supply 14, 16. For example, an ESU life cost function associated with the at least one ESU 14 can be determined based on at least a number charge/discharge cycles or based on a depth of discharge (DoD) which is calculated as the energy discharged as a percentage of capacity in each discharge cycle. A genset life cost function associated with the at least one genset 16 can be determined based on at least number and frequency of genset starts, genset operational time, and related maintenance costs. The AMC 24 is also configured to respect minimum and maximum loading thresholds, maximum reactive power loading, avoidance of reverse power for gensets, discharge/charge power limits for ESU 14, optimal discharge/charge power limits for ESU 14, and maintaining minimum SoC and maximum SoC limits according to protection and safety standards.

The AMC 24 is configured to distribute the load 20 among the various types of power sources 14, 16, while meeting reserve 21, based on the cost function associated with each power source 14, 16. The cost function is based on the energy consumption cost function and/or life cost function associated with each power source 14, 16; and the power demand of the reserve 21 is a predetermined amount of unutilized power that is apportioned or made available to account for transient load spikes or scheduled loads and ensure that there is sufficient reserve power to meet the demands of the load 20 and the transients or scheduled loads. The AMC 24 then assigns a priority to each power source 14, 16 based on the corresponding cost function and then selectively determines the use of the power sources 12 based on the determined priority service the load demand 20 and reserve power demand 21.

The AMC 24 distributes the power demand of the load 20 between each of the activated powers sources 12 connected to the common bus 18, while ensuring available reserve to meet or exceed the reserve demand 21. It should be appreciated that the power demand may include negative loads which implies charging the ESU 14 and thus loading the genset 16 higher than the power demand of the load 20. Each type of active power source 14, 16 can share the distributed power demand of the load proportional to their rated power, or they may be distributed based on priority as well as optimizing the overall cost function for the corresponding power source 14, 16.

The AMC 24 determines an optimal cost function associated with an optimal distribution of the load 20 to ensure reliable power can be supplied to the load 20; to ensure prolonged lifetime for each of the power sources 14, 16; and to ensure the micro-grid system 10 is operating at a lowest achievable cost. The cost function may aim to minimize fuel cost, maximize lifetime, and increase reliability. For example, if the ESU 14 has a lower cost function than the genset 16 and can meet the power demand of the load 20 and reserve 21, then the genset 16 may be deactivated, if the micro-grid system operation mode allows it (e.g., economy mode). On the other hand, if the ESU 14 has a higher cost function (including its use for charging) compared to the genset 16, the ESU 14 maybe commanded by the AMC 24 to an idle state. The idle state for the ESU 14 includes a state in which neither charging or discharging is occurring, yet the ESU 14 is still available to be charged or discharged in response to frequency/voltage transients for regulating the bus.

Typically, the ESU 14 cost function will be lower than for a genset 16, if it has been charged optimally from most efficient sources; however, the ESU cost function may be higher if the genset 16 loading is within its optimal range while the ESU 14 cost function needs to account for DPL/CPL along with the cost associated with how the ESU 14 was charged to the current SoC. If the ESU 14 is charged by expensive sources such as the grid 30 at a peak rate or lower priority gensets 16, it will be associated with a higher cost.

The AMC 24 can also ensure meeting the predetermined power demand of the reserve 21 by determining an available reserve power of the activated power sources 12. If the available reserve power is inadequate to meet the demand of the reserve 31, additional power sources 14 are activated in priority based on their corresponding cost functions. to ensure that any sudden increase in the load 20 can be adequately met. The AMC 24 determines the available reserve power based on a difference between the power demand of the load and an available power of the activated power sources 12. Note that any available reserve power or a portion of the reserve power, such as the spinning reserve in the genset 16, that is not utilized can be redirected by the AMC 24 to each ESU 14 based on the assigned priority until an optimal state of charge threshold or limit is reached while also improving the loading of the activated genset 16 to a potentially more efficient load factor. The AMC 24 may prioritize and an optimal loading factor on a genset 16 and the resulting reserve power can be redirected. Typically, the spinning reserve power is not utilized when not servicing transient spikes in load demand. However, the spinning reserve power can be redirected to charge the ESU's 14 in order of priority.

Figure 2:
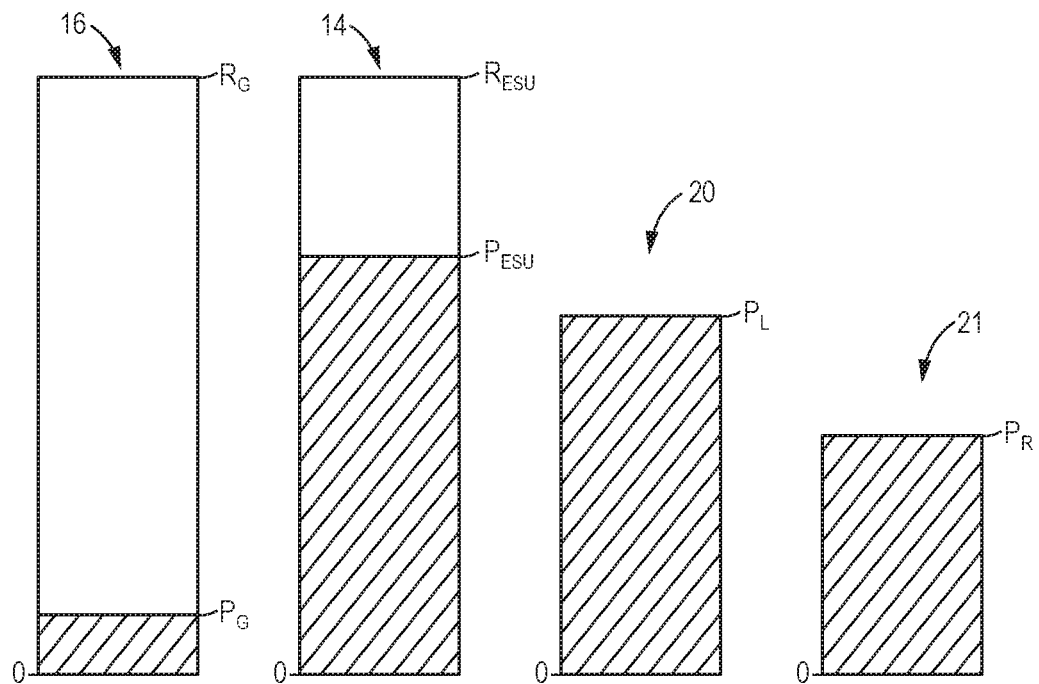
FIGS. 2-4 are illustrations of operating power levels in accordance with an embodiment of the present disclosure.

The AMC 24 is also configured to ensure the micro-grid system 10 is operating at the lowest available operating cost. In one embodiment, illustrated in FIG. 2, the micro-grid system 10 has the situation where the ESU 14 has a lower cost than genset 16. FIG. 2 illustrates a power chart for the genset 16 which has a full load rating of $R_G$, the ESU 14 which has a full discharge power rating (max discharge limit) of $R_{ESU}$, the demand 20 with a power demand of $P_L$, and the reserve 21 which has a reserve request of $P_R$. Note that all the power levels described in the figures refer to the output power levels at the load 20, accounting for losses in ESU (e.g., inverter and battery losses) and genset (e.g., generator, engine) as well as bus transmission losses for both ESU and genset. In economy mode where operation on ESU 14 alone is acceptable, the genset can be deactivated if the ESU 14 can handle the combined power demand of $P_L$ and $P_R$ where $P_{ESU}=P_L$ and $(R_{ESU}-P_{ESU})>P_R$. In other words, the discharge load $P_{ESU}$ should be equal to the power demand of the load $P_L$, while the available reserve $(R_{ESU}-P_{ESU})$ should be at least equal to or greater than the power demand of the reserve $P_R$. If deactivated, the genset 16 power $P_G$ would be zero. If genset 16 has to stay active for reliability reasons (e.g., reliability mode), it may operate at $P_G$ equal to a minimum acceptable power level $P_{Gmin}$ for an operational genset, with $P_{ESU}=P_L-P_G$, as illustrated in FIG. 2, to provide optimal operating cost, with the constraint of genset staying active.

Figure 3:
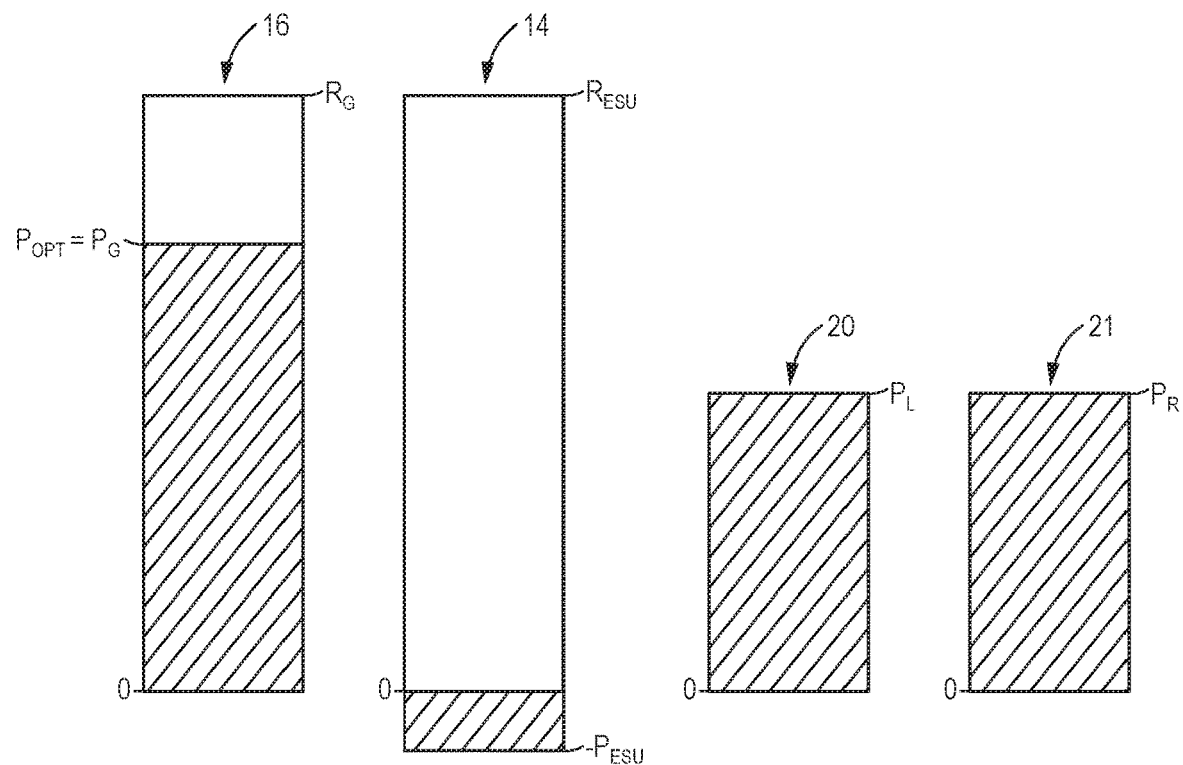

With reference to FIG. 3, another embodiment includes a situation where the genset 16 is configured by the AMC 24 to meet the demands of load 20 and reserve 21 while also charging the ESU 14. In this example, the genset 16 has $P_G=P_{OPT}=(P_L-P_{ESU})>P_L$, since $P_{ESU}$ is negative (implying charging) while the available reserve power requirement stays the same $(R_G-P_G)+R_{ESU}\geq P_R$. Note that the magnitude of charging power $P_{ESU}$ should be within a charging power limit for the ESU. This situation typically arises when there is no local power utility grid 30 to augment the micro-grid system 10. In such situations, the lowest operating cost is the genset 16 operating near or at its most efficient load factor $P_{OPT}$ while utilizing the fuel type having the lowest associated cost which will yield the lowest cost function or highest priority. This is because the ESU 14 has the detrimental cost of the CPL incurred currently while charging and a future detrimental cost of the DPL while discharging thus yielding a higher cost function than the genset 16 operating at $P_{OPT}$. The AMC 24 will then prioritize the genset 16 higher than the ESU 14 while commanding the genset 16 to operate at the most efficient load factor. Any available power generated by the genset 16 beyond the power demand of the load 20 is then supplied to charge the ESU 14 as denoted by $(P_{OPT}-P_L)=P_{ESU}$ as determined by the AMC 24.

Figure 4:
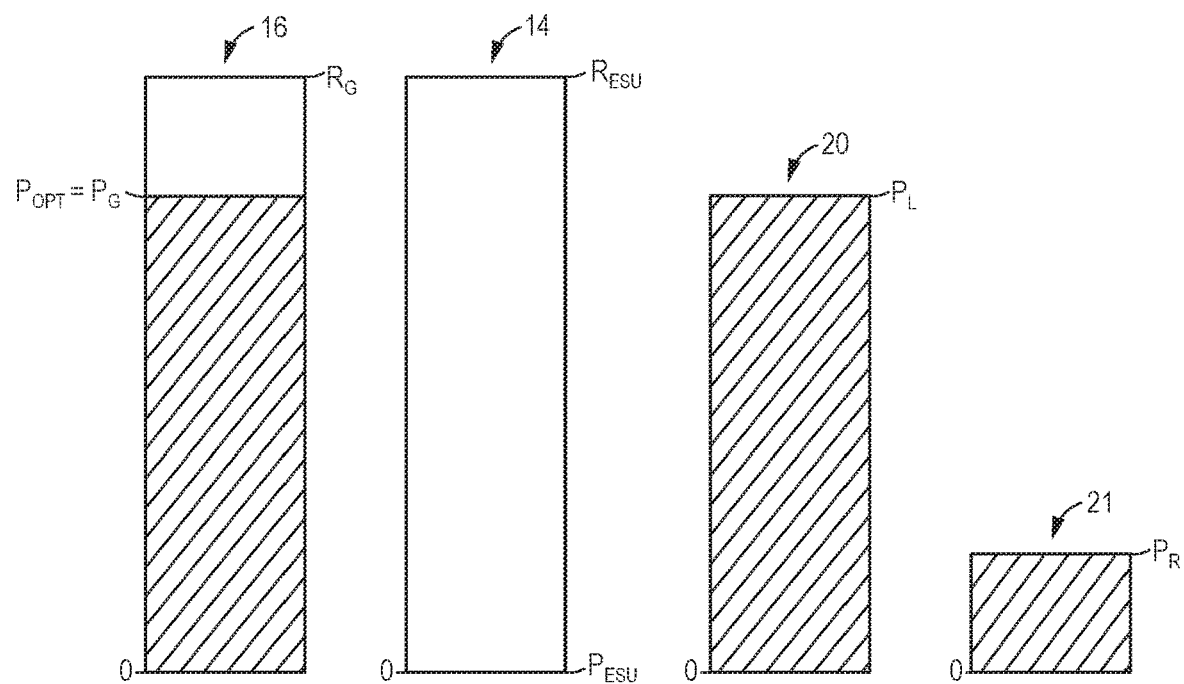

With reference to FIG. 4, another embodiment includes a situation where the AMC 24 commands the genset 16 to only service the power demand of the load 20 and the reserve 21 while the ESU 14 is set to idle to ensure the operation of the genset 16 is at an optimal state with a lower cost function than the ESU 14. In this example, $P_G=P_{OPT}=P_L$ while $(R_G+R_{ESU}-P_{OPT})\geq P_R$ and $P_{ESU}=0$ which is merely an idle state.

It should be appreciated that the AMC 24 is configured to command the ESU 14 and genset 16 under various other situations. For example, where the ESU 14 services the power demand of the load 20 and the genset 16 services the reserve 21, denoted as $P_{ESU}=P_L$ and $P_G=P_R$. Similarly, the gensets 16 maybe commanded by the AMC 24 to maintain a spinning reserve state where $R_G=P_G$ which can then be used to service to the reserve 21, denoted as $R_G=P_G=P_R$.

In another example, the local utility grid 30 may have the lowest cost function in which power $P_{GRID}$ from the local utility grid 30 can be used to service the load 20 and charge the ESU 14 denoted as $P_{GRID}=P_L+P_{ESU}$. Since the utility grid 30 can scale its output efficiently, it is generally not necessary to apportion power for the reserve 21. It should be appreciated that the cost to charge the ESU 14 is factored into the corresponding cost function. For example, charging the ESU 14 from the local utility grid 30 may be cheaper than charging via the genset 16. Conversely, charging the ESU 14 from genset 16 operating at $P_{OPT}$ may be cheaper than charging from the local utility grid 30. The AMC 24 may command the genset 16 to operate at $P_{OPT}$ and the overhead $(P_{OPT}-P_G)$ can be used to charge the ESU 14 rather than the utility grid 30 because of the lower cost function.

The AMC 24 determines the cost function for each of the plurality of power sources 12 based on the recorded operational data stored in the memory module 28 and compares the data to rules that are defined by optimal charge and discharge thresholds in real time such that the cost function is constantly updated during operation. This ensures that that when a power source 14, 16 becomes more expensive to operate compared to other power sources 14, 16 the AMC 24 will distribute the load 20 to a more efficient power source 14, 16 or the utility grid 30 if applicable. It should be understood that while the ESU 14 and genset 16 are described in the singular, the AMC 24 is configured to enable, disable, or adjust the load distributed on individual ESU's within the set of ESU's 14 and individual gensets within the set of gensets 16 as depicted in FIG. 1.

If the power demand of the load 20 and reserve 21 cannot be met by currently activated power sources 12, additional power sources 12 are activated, as commanded by the AMC 24, in order of priority such that higher priority power sources 12 have lower cost functions currently associated with them. Similarly, if the power demand of the load 20 and the reserve 21 can be met with fewer activated power sources 12, the AMC 24 commands the lowest priority active power source 12, i.e. having the highest cost function of active power sources 12 to deactivate, in the case of a genset 16, or idle, in the case of an ESU 14. As previously stated, and idled ESU 14 is still connected to the common bus 18 but is not currently receiving any power commands from the AMC 24 but is still available to meet sudden changes in load, make adjustments in response to frequency, or voltage fluctuations. The reserve needed is determined to take into account the delay for the next genset 16 to become active and synchronize frequency and/or voltage, and connect to the bus. For example, the activation time between various types of gensets 16, and gensets 16 themselves varies greatly. It should be appreciated that the cost function may not be a mathematical relationship but maybe a value associated with a marginal cost or a cost consideration related to the current operating conditions based on the recorded operation data.

In order to provide reliable power at the lowest cost consideration, the AMC 24 is configured to monitor losses associated with energy storage within the at least one ESU 14 along with the operational factors in order to determine the corresponding cost function. Energy storage has inherent losses that can be accounted for when determining optimal operating conditions to ensure a high charging and discharge efficiency while maintaining a long useable lifetime. A discharge power loss (DPL) occurs when an activated ESU 14 is discharging power to the common bus 18 in order to provide power to the load 20. Similarly, a charge power losses (CPL) occurs between the ESU 14 and the genset 16 or the local utility 30 when an active ESU 14 is being charged by the genset 16 or the local utility 30. The losses occur at least according to a thermal loss stemming from an internal resistance of each ESU 14, an inverter conduction loss, an inverter switching loss, and the like. The losses can determined be based on historical data, in real-time, based on a manufacturer specifications, or the like. Together the DTL and CTL account for a round trip efficiency (RTE) associated with each ESU 14.

Figure 5:
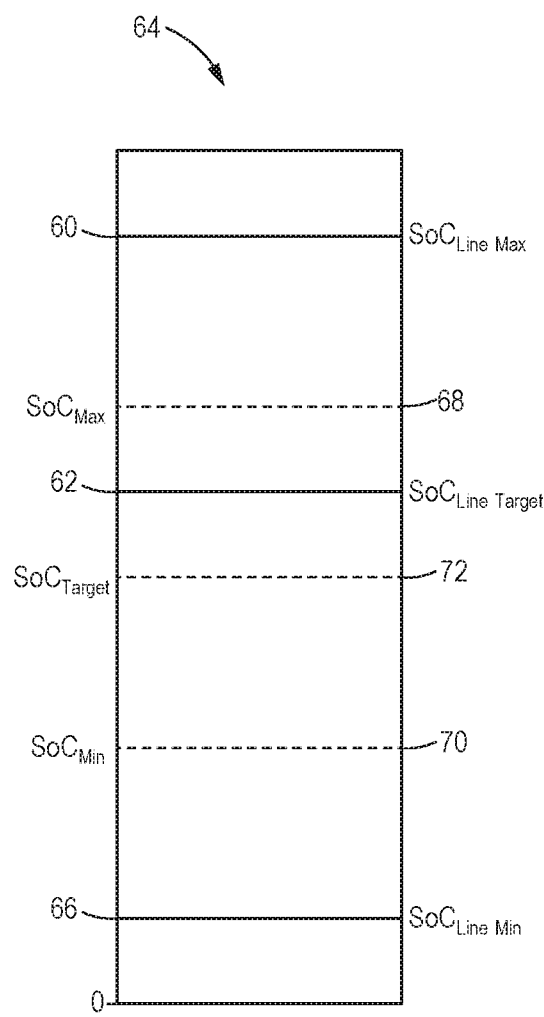
FIGS. 5-6 are illustrations of state of charge of an energy storage unit in accordance with an embodiment of the present disclosure.

With reference to FIG. 5, a total charge capacity 60 of the ESU 14 with a current SoC 62 is illustrated. Each ESU 14 has a number of SoC limits that are chosen based on optimizing maximum lifetime considerations as well as safety limits dictated by the internal battery management system (BMS). If an ESU 14 is detected operating beyond the safety limits, the BMS will force the corresponding ESU 14 to become disabled. The $SoC_{LimMax}$ 64 and $SoC_{LimMin}$ 66 are examples of these safety limits. Each ESU 14 has various state of charge limits that are not necessarily fixed and may be varied by the AMC 24 based on at least the load cycling, SoH, and remaining expected life for the ESU 14. For example, each ESU 14 may have a $SoC_{Max}$ 68 and a $SoC_{Min}$ 70 which defines an optimal charge range. In addition, each ESU 14 has a target SoC denoted as $SoC_{Target}$ 72 between the $SoC_{Max}$ 68 and a $SoC_{Min}$ 70 that is selected to provide adequate battery capacity during discharge as well as provide room for charging the battery if there is unutilized available reserve power, such as from loading the genset to $P_{OPT}$. The $SoC_{Target}$ 72 is also associated with the optimal SoC which prolongs the ESU's 14 overall lifetime and usability. The AMC 24 can adjust $SoC_{Max}$ 68 and a $SoC_{Min}$ 70 to adjust the cost function for optimal performance by minimizing cycling. For example, setting $SoC_{Max}$ 68 and a $SoC_{Min}$ 70 closer together increases the lifetime of the ESU 14 while reducing the ESU 14 capacity for charging and discharging. If $SoC_{Max}$ 68 is reached, the AMC 24 commands the ESU 14 to discharge the SoC 62 to the load 20, or even to the local utility grid 30 (if permitted) until the SoC 62 is below $SoC_{Max}$ 68. Similarly, if $SoC_{Min}$ 70 is reached the AMC 24 commands the ESU 14 to be charged from either the genset 16 or the local utility grid 30 based according to the current cost function.

Figure 6:
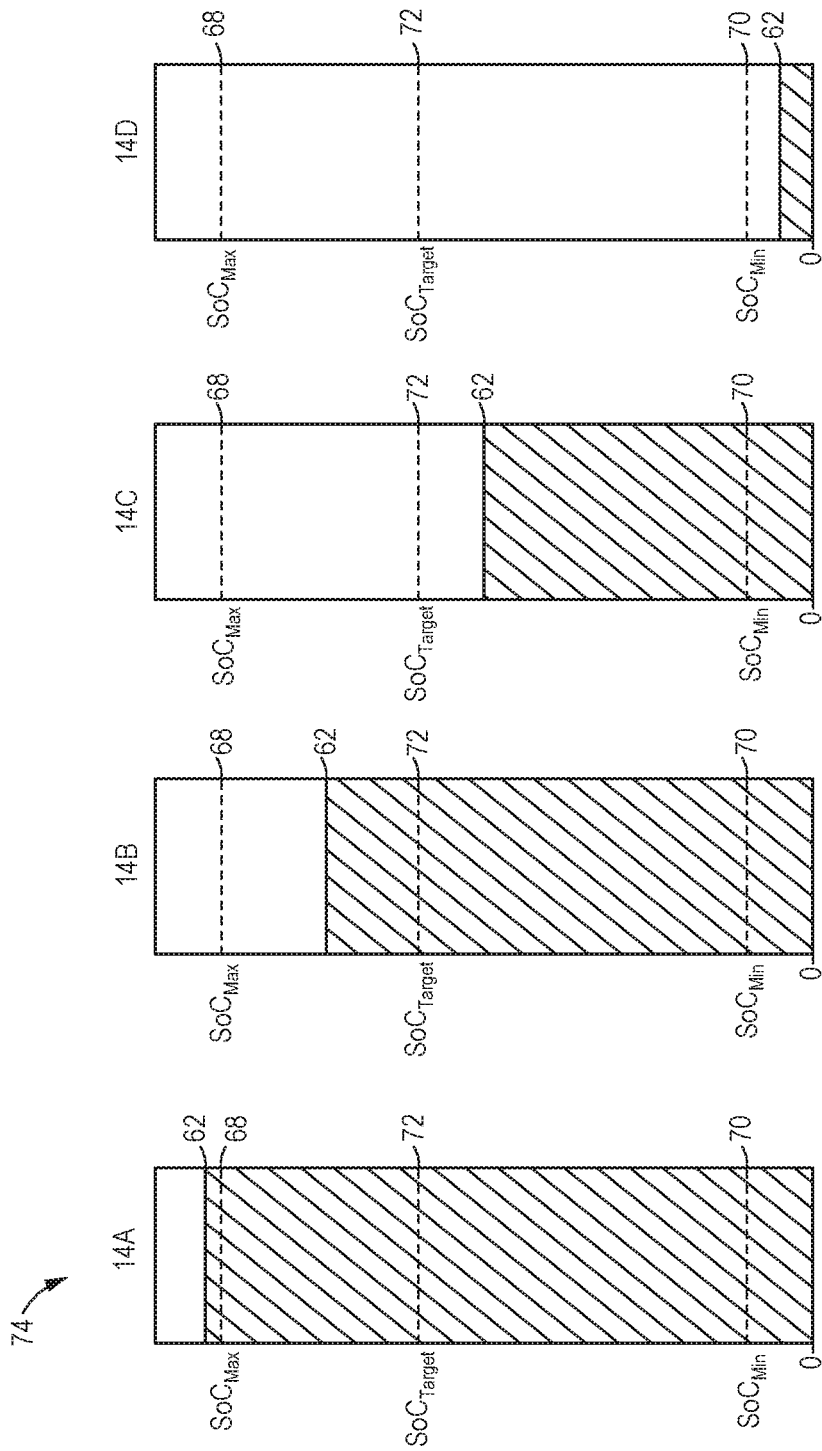

With reference to FIG. 6, a cascade 74 of multiple ESU's 14A-14D is in parallel connected to the common bus 18 with each corresponding SoC 62 is illustrated. The priority for discharging the ESU's is from 14A having the highest priority to 14D having the lowest priority. In other words, the higher the SoC 62 the higher the discharging priority. Vice versa, the charging priority is from 14D having the highest charging priority to 14A having the lowest charging priority. In other words, having the lower SoC 62, the higher the charging priority.

The optimal $SoC_{Max}$ 68 and a $SoC_{Min}$ 70 limits are chosen as a trade-off of various operation factors. For example, if the chosen $SoC_{Max}$ 68 and a $SoC_{Min}$ 70 limits are too relaxed, e.g. far apart allowing for greater capacity, the overall energy consumption cost is reduced due to the increase in charge capacity and the overall life cost is also increased because the rapid cycling. Conversely, if the chosen $SoC_{Max}$ 68 and a $SoC_{Min}$ 70 limits are too constrained, e.g. too close apart allowing for reduced, the life cost is improved at the expense of the increased energy consumption cost that is higher as the genset 16 will be operating in an inefficient manner in concert. The optimal limits $SoC_{Max}$ 68 and a $SoC_{Min}$ 70 can be determined based on allowing a number of deep discharge or charge cycles in a period of time and with consideration of accumulated life per cycles relative to total life per cycles permissible.

Figure 7:
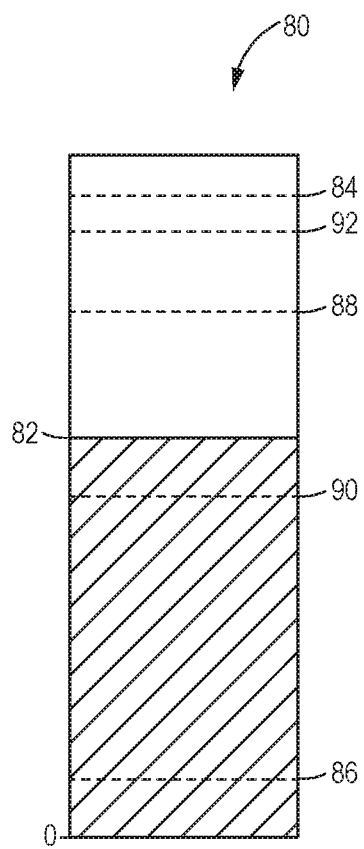
FIGS. 7-8 are illustrations of operating power of a genset in accordance with an embodiment of the present disclosure.

Each transfer unit 22 associated with a corresponding ESU 14 monitors the actual charge or discharge power levels, SoC, available energy, various charge and discharge thresholds, and the like and transmits the data to the AMC 24 such that the AMC 24 can transmit charge or discharge power command signals for each subsequent time step based on evaluations of the various cost functions based on available data. The AMC 24 can transmit control signals for charge or discharge power commands to each transfer unit 22 to control the operation of the ESU 14 based on the various cost functions. For example, if any ESU 14A-14D in the cascade of ESU's 74 is approaching either SoC limits $SoC_{Max}$ 68 or a $SoC_{Min}$ 70, the AMC 24 will instruct the corresponding transfer unit 22 to either enter an idle state or initiate discharging or charging, respectively, in order to return the SoC 62 to below $SoC_{Max}$ 68 or above $SoC_{Min}$ 70. Similarly, the AMC 24 will transmit control commands to each corresponding transfer unit 22 to ensure that the load 20 and reserve 21 demand are met while ensuring ESU's 14 remain within $SoC_{Max}$ 68 and a $SoC_{Min}$ 70, With reference to FIG. 7, a total operating capacity 80 of the genset 16 with a current load 82 is illustrated. Similar to the ESU 14, each genset 16 has a plurality of operational thresholds that ensures highest efficiency load factor, lowest fuel consumption, optimal spinning reserve, and lowest emissions production while reducing the number of power cycles (i.e. start/stop cycles) and avoiding minimum loading conditions to avoid wet stacking. Each genset 16 has a maximum loading limit 84 based on a predetermined genset rating and a minimum loading limit 86 based on optimal overall lifetime and for the prevention of wet stacking. Each genset 16 also has an optimal operating range defined by an optimal upper threshold 88 and an optimal lower threshold 90 where the genset 16 performance is operating at the highest efficiency rated for the particular genset 16. It should be appreciated that this range is an illustrative example and the optimal operating region can be represented by a single threshold, a plurality of thresholds, a plurality of ranges, and the like. Each genset 16 also has a target maximum threshold 92 which should only be exceeded for short periods to account for transient conditions beyond the capability of the ESU 14. Exceeding the target maximum threshold 92 too often has a detrimental effect on the overall lifetime of the genset 16 and should be avoided unless necessary.

The AMC 24 distributes the load among active gensets 16 based on an optimization of the energy consumption cost function, while maintaining operation thresholds such as staying between optimal minimum and maximum thresholds 88, 90 as described above. While it is desired to keep each genset 16 at its corresponding optimal efficiency loading point, it is not always possible as the loading and charging available from the ESU 14 may not be adequate, or the demand from the load 20 and the reserve 21 are too high even with discharging available from the ESU 14. In many cases, the AMC 24 distributes the load among active gensets 16 in equal proportion to each corresponding genset rating; however, other distributions are possible for optimal cost function.

Each genset has a plurality of trigger thresholds that define whether to add or drop a genset 16, that is whether to activate, deactivate, or idle a genset 16. If the load 20 and reserve 21 for an expected duration cannot be maintained for a certain time with the currently active gensets 16 and ESU's 14, the AMC 24 may activate a currently inactive genset 16 with the highest priority, i.e. the genset 16 with the lowest cost function among currently inactive gensets 16. The activation of a subsequent genset 16 in a cascade of all power supplies 12 can be delayed by the ability of the ESU 14 to service the load 20 and apportion or make available the reserve 21 whereas micro-grid systems without ESU's 14 could not afford this delay to prevent brown out or black out. Similarly, if the AMC 24 determines that the power demand of the load 20 and reserve 21 for an expected duration can be met with a reduced number of active gensets 16, the lowest priority genset 16 among active gensets 16 is deactivated by disconnecting the corresponding genset 16 from the common bus 18 and shut down after a safe cool down routine.

In existing genset systems, fixed add/drop thresholds are used for adding and dropping gensets 16 with proportional load sharing, but these thresholds are typically very conservative and are fixed thresholds leading high energy consumption costs and do not necessarily account for needed spinning reserve. The AMC 24 is configured to adjust the add/drop thresholds dynamically based on the corresponding cost function while still meeting the load 20 and reserve 21 demands, thus resulting in a reduction of the operating cost of the micro-grid system 10, while ensuring reliability. The AMC 24 can determine whether adjusting an add/drop threshold for a corresponding genset 16 will reduce the associated cost function and/or the cost to operate the micro-grid system 10. For example, if the load 20 and reserve 21 cannot be met with the currently activated gensets 16 and ESU's 14, the highest priority genset 16 that is not active is activated. Similarly, if the load 20 and reserve 21 demand can be met with ESU's 14 and a reduced number of active gensets 16, the lowest priority active genset 16 can be deactivated to meet a decrease in the power demand of the load. There are timers involved in activation and deactivation of gensets so that the life cost function of gensets with excessive number of starts is not compromised while optimizing operating cost of fuel consumption. The choice of the timers for sustained conditions for activation and deactivation are chosen to balance operating cost function as well as life cost function.

Figure 8:
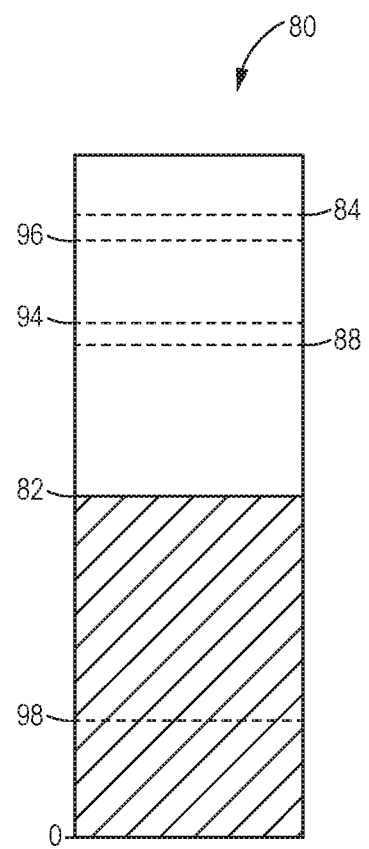
Figure 9:
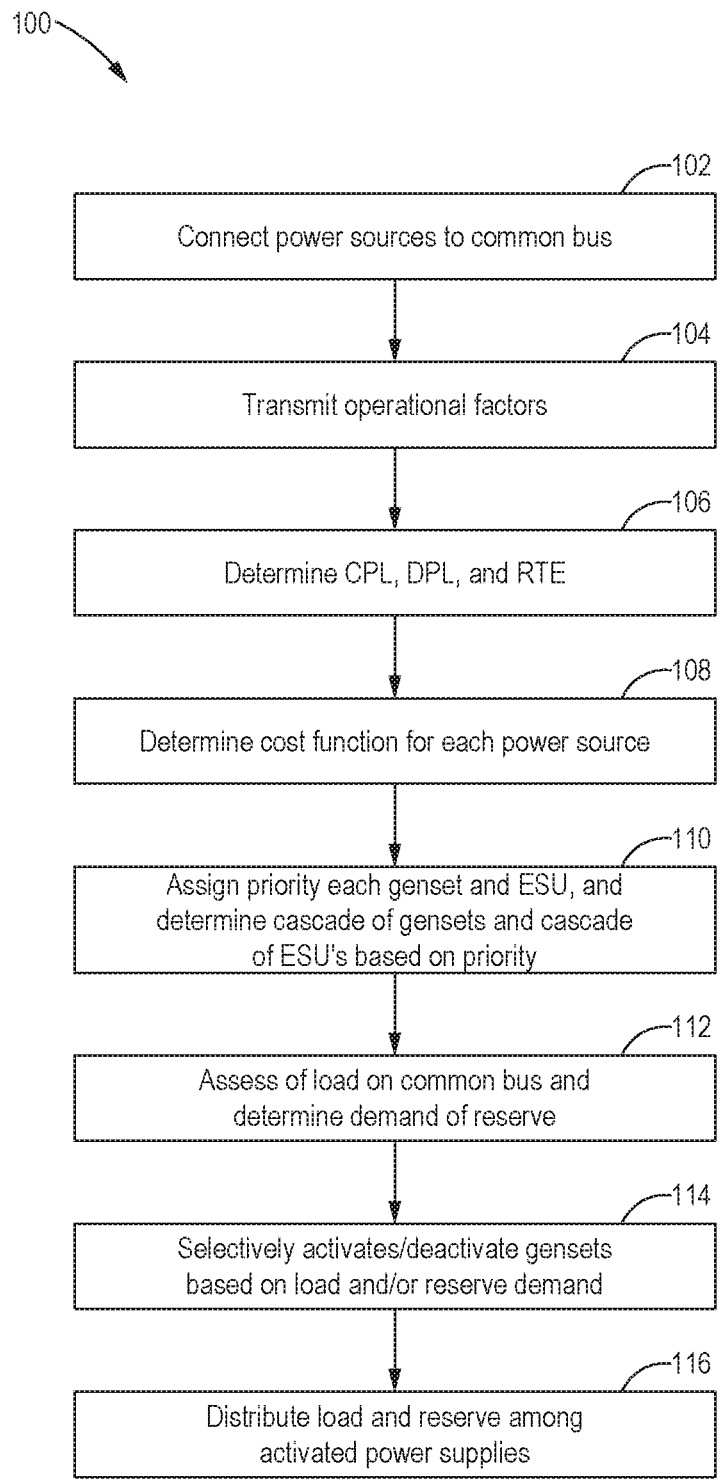
FIG. 9 is a flow chart of a method in accordance with an embodiment of the present disclosure.

With reference to FIG. 8, each genset 16 has an add threshold 94 just beyond the optimal upper threshold 88 which signifies that the current genset 16 is operating just beyond the optimal load and a subsequent genset 16, i.e. the next highest genset 16 according to the cascade or assigned priorities, should be brought online to service the load 20 and reserve 21. A fast-add threshold 96 indicates that genset 16 is operating beyond the target maximum threshold 92 and dangerously close to the maximum loading limit 84. In this instance, a subsequent genset 16 is brought on quickly circumventing standard startup procedures to quickly service the load 20 and the reserve 21 in case a transient may push the current loading 82 beyond the rated maximum loading limit 84. Each genset 16 also has a drop threshold 98 which signifies that the corresponding genset 16 is to be turned off and disconnected from the common bus 18. It should be appreciated that the maximum and minimum loading limits 84, 86; the optimal maximum and minimum thresholds 88, 90; the add threshold 94; fast-add threshold 96; and drop threshold 98 define the upper and lower operating thresholds for the genset 16.

It should be appreciated that the thresholds described for each type of power source 14, 16 maybe at least stored in the memory module 28 as user selectable settings. A user can adjust the setting via an external computing device (not shown) communicatively coupled with the AMC 24. The thresholds can be stored as a look-up table that stores the relevant settings for each particular type of power source 14, 16.

INDUSTRIAL APPLICABILITY

In general, the micro-grid system 10 of the present disclosure can find applicability in in various industrial applications such as but not limited to land drilling, offshore drilling, remote villages, islands, remote mining sites, remote military installations, on-board ships. The micro-grid system 10 may include at least an ESU 14 and a genset 16. The power sources 12 are configured to meet the power demand requirements when a load 20 is applied to a common bus 18 and a prescribed reserve demand 21 is requested. By generating a cost function and maintaining operation of the power sources 12 within optimal operating ranges, an AMC 16 can reduce the overall operating cost of the micro-grid system 10.

During operation, the transfer units 22 transmit signals regarding the recorded operational data to the AMC 24 and the AMC determines and updates the cost function in real-time for each power source 14, 16 during operation while servicing the load 20 and reserve 21. The AMC 24 assigns a priority to each ESU 14 among a plurality of ESU's and to each genset 16 among a plurality of gensets 16 based on the corresponding cost function. The AMC 24 then determines a cascade of ESU's 14 and gensets 16 based on the assigned cost function. The AMC 24 then selectively activates or deactivates gensets 16 in the cascade while also selectively commanding ESU's 14 in the cascade to charge or discharge according to an assessed sum of the load 20 on the common bus 18. The AMC 24 also assess a power demand for a reserve 21 based on an available reserve among both ESU's 14 and genset 16. The AMC 24 then selectively activates additional gensets 16 in order of assigned priority to meet load 20 and reserve 21 demands or selectively deactivates active gensets 16 as appropriate. The AMC 24 determines how the load 20 is distributed and the reserve 21 is apportioned among the active power supplies 12. If in economy mode, the AMC 24 commands all of the gensets 16 to shutdown such that the ESU's 14 alone are servicing load 20 and reserve 21.

The AMC 24 determines the cascade of gensets 16 and the cascade of ESU's 14 based on the determined priority which in turn is based on the determined cost function. Typically, the ESU's 14 of the cascade are always active on the common bus 18, but maybe commanded by the AMC 24 to idle. If an increase in the demand of the load 20 and/or the reserve 21 is detected by the AMC 24 a subsequent ESU's 14 in the cascade may be activated. On the other hand, gensets 16 of the cascade of gensets 16 remain deactivated until commanded by the AMC 24 to service the load 20 and/or to provide reserve 21 and/or to charge ESU's 14. As described above, the order of gensets 16 in the cascaded is determined by the assigned priority as determined by the AMC 24. If an increase in the demand of the load 20 and/or the reserve 21 is detected by the AMC 24 a subsequent genset 16 in the cascade may be activated.

If it is determined by the AMC 24 that the cost function of an active power supply 12 has exceeded a currently deactivate genset 16 or idle ESU'14, the AMC 24 assigns the subsequent power source 14, 16 with a high priority and activates the corresponding power source now promoted and the relegated power source 12 is deactivated. The AMC 24 dynamically updates the cost function in real time for each power source 14, 16 while the micro-grid system 10 is in operation thus affecting the order of the cascade based on the updated priority assigned to the corresponding power source 14, 16 to find the optimal strategy to lower the overall cost function of the micro-grid system 10.

Figure 10:
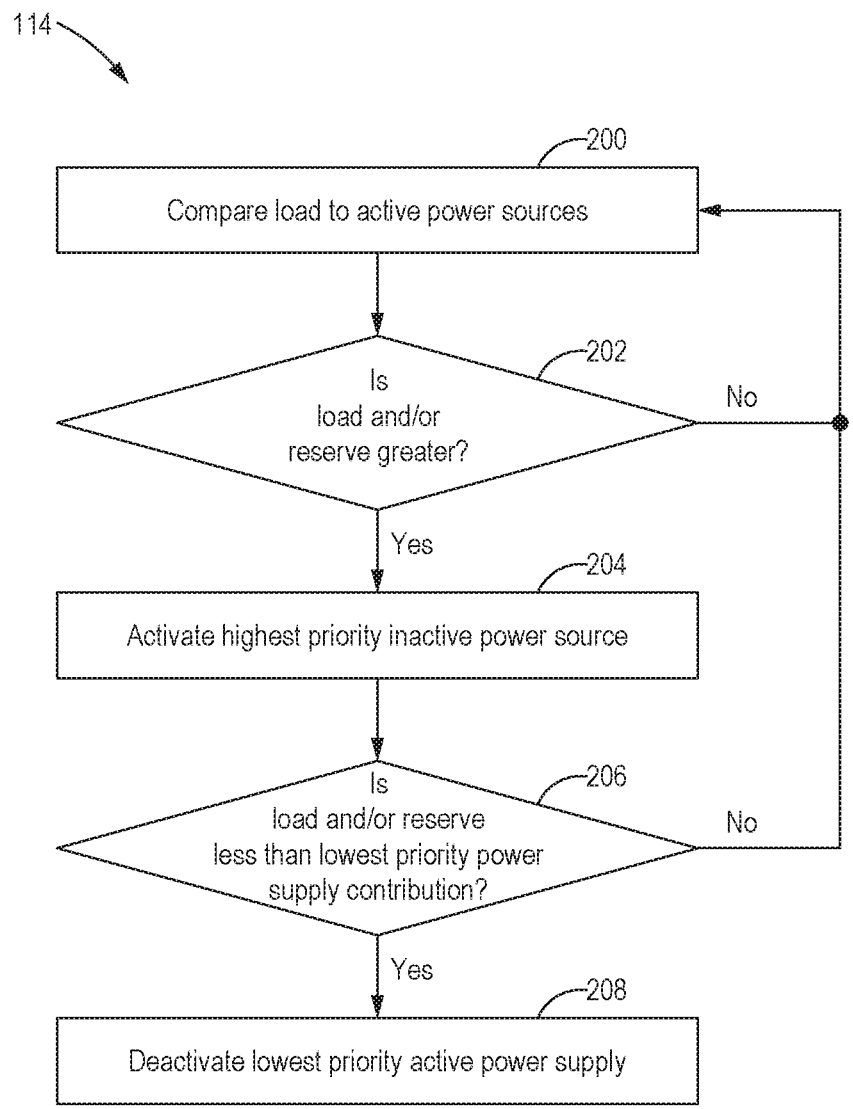
FIG. 10 is a flow chart of a method in accordance with an embodiment of the present disclosure.

With reference to FIG. 10, a flow chart 100 of a method of operating a micro-grid system 10 is presented. At block 102, the power source 14, 16, are connected to the common bus 18, and the corresponding transfer units 22 transmits data related to the operational factors which are then received by the AMC 24 for storage in the memory module 28, block 104. The AMC 24 then determines the CPL, DPL, and RTE for each ESU 14, block 406. At block 108, the AMC determines a cost function for each genset 16 based on the transmitted operational factors and for each ESU 14 based on the CPL, DPL, RTE, and the operational factors. At block 110, the AMC 24 assigns a priority to each genset 16 and ESU 14 based on their corresponding cost function and determines a cascade of gensets 16 and a cascade of ESU's 14 based on the corresponding priority. At block 112, the AMC 24 assesses the power demand of the load 20 and determines the power demand requirements of the reserve 21. At block 114 The AMC 24 then selectively activates or deactivates as needed to meet the load 20 and/or reserve 21 demand according to the assigned priority in the cascade of gensets 16. At block 116, the AMC 24 distributes the load 20 and reserve 21 demand among active gensets 16 and ESU's 14 by controlling the corresponding transfer units 22.

With reference to FIG. 11, a flow chart of the method step of block 114 for selectively activating or deactivating gensets 16 according to the assigned priority within a cascade of gensets 16 is illustrated. The AMC 24 compares the load 20 and the reserve 21 capacity to the capacity or available power of the active power sources 14, 16, block 200. In block 202, if the power demand of the load 20 and/or the reserve 21 exceeds the capabilities of the currently active power supplies 14, 16, then the AMC 24 activates a subsequent power supply 14, 16 in the cascade of power supplies 14, 16 to service the load 20 and/or reserve 21 beyond the capabilities of the currently active power sources 14, 16. In other words, the AMC 24 activates the highest priority inactive power 14, 16, block 204. In block 206, the AMC 24 determines if the power demand of the load 20 and reserve 21 is below the servicing capacity of the lowest priority power source 14, 16. In other words, AMC 24 determines whether the lowest priority power source 14, 16 is providing any power to the load 20 and/or reserve 21. If not, the AMC 24 deactivates or idles the lowest priority power source 14, 16 to meet a decrease in the power demand that is currently active because the remaining active power source(s) in the cascade is/are collectively capable of servicing the load 20 and/or reserve 21, block 208.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein is merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A micro-grid system, the system comprising:
   a plurality of power sources each configured to selectively supply power to a common bus, the plurality of power sources including at least one genset and at least one energy storage unit (ESU); and
   an asset management controller (AMC) operatively coupled to the plurality of power sources, wherein the AMC is configured to:
   determine a discharge power loss (DPL) between the at least one ESU and a load connected to the common bus,
   determine a charge power loss (CPL) between the at least one ESU and the at least one genset,
   determine a genset cost function associated with the at least one genset, wherein the genset cost function is based on at least an efficient load factor,
   determine an ESU cost function associated with the at least one ESU, wherein the ESU cost function is based on at least the DPL and CPL;
   assign a priority to the at least one ESU and the at least one genset based on the corresponding cost function,
   selectively activate power sources based on the determined priority and a power demand of a load, and
   distribute the power demand of the load connected to the common bus to the activated power sources.

2. The system of claim 1, wherein the AMC is further configured to:
   determine a cascade of ESU's and a cascade of gensets based on the assigned priority;
   determine the power demand of the load and a power demand of a reserve;
   determine an available reserve among the activated power sources; and
   distribute the power demand of the load among the activated power sources and apportion the power demand of the reserve among the available reserve of activated power sources.

3. The system of claim 2, wherein the AMC is further configured to:
   determine an unutilized available reserve power among the activated power sources; and
   redirect a portion unutilized available reserve power to an ESU based on the assigned priority until an optimal charge limit threshold is reached.

4. The system of claim 1, wherein the AMC is further configured to:
   selectively activate an inactive power supply with the highest priority to meet an increase in the power demand of the load; and
   selectively deactivate an active power supply with the lowest priority to meet a decrease in the power demand of the load.

5. The system of claim 1, wherein the DPL loss is determined based on power loss between each ESU and the load during a discharge cycle, and the CPL is determined based on power loss between each ESU and each genset during a charge cycle.

6. The system of claim 1, wherein the genset cost function is also based on at least an genset energy consumption cost and a genset life cost function.

7. The system of claim 1 wherein the ESU cost function is also based on at least a ESU energy consumption cost and an ESU life cost function.

8. The system of claim 5, wherein the genset energy consumption cost is based on at least one of a an optimal efficiency range, an add threshold, a fast add threshold, a drop threshold, a target threshold, spinning reserve threshold, a maximum rated threshold, and a minimum rated threshold.

9. The system of claim 2, wherein the ESU energy consumption cost is based on at least one of an optimal charge power limit, an optimal discharge power limit, maximum charge limit, a maximum discharge limit, a maximum state of charge, a minimum state of charge, and a target state of charge.

10. The system of claim 1, further comprising:
a remote utility grid connected to the common bus; and
wherein the AMC is further configured to:
determine an operating cost associated with each cost function and an operating cost of the utility grid,
compare an aggregate operating cost of the plurality of power sources with the operating cost of the utility grid, and
selectively distribute the power demand of the load to the utility grid based on the comparison.

11. A micro-grid system, the system comprising:
a plurality of power sources each configured to selectively supply power to a common bus, the plurality of power sources including a plurality of ESU's and a plurality of gensets each connected to the common bus in parallel; and
an AMC operatively coupled to each of the plurality of power sources, wherein the AMC is configured to:
determine a DPL between each ESU and a load connected to the common bus,
determine a CPL between each ESU and each genset,
determine an ESU cost function for each ESU based on at least the corresponding DPL and CPL,
determine a genset cost function for each genset based on at least an efficient load factor,
assign a priority to each ESU of a cascade of ESU's and to each genset of a cascade of gensets based on the corresponding cost function,
determine a power demand of the load connected to the common bus and a power demand of a reserve,
selectively activate power sources based on the determined priority and a power demand of the load and the reserve,
determine an available reserve power among the activated power sources; and
apportion the power demand of the reserve to the available reserve power among activated power sources.

12. The system of claim 11, wherein the AMC is further configured to:
determine an unutilized available reserve power among the activated power sources; and
redirect the unutilized available reserve power to an activated ESU based on the assigned priority until an optimal charge limit threshold is reached.

13. The system of claim 11, wherein the AMC is further configured to:
determine an order of the cascade of ESU's and cascade of gensets based on the assigned priority;
selectively activate an inactive power supply with the highest priority to meet an increase in the power demand of the load; and
selectively deactivate an active power supply with the lowest priority to meet a decrease in the power demand of the load.

14. The system of claim 11, wherein the DTL loss is determined based on power loss between each ESU and the load during a discharge cycle, and the CTL is determined based on power loss between each ESU and each genset during a load cycle.

15. The system of claim 11, further comprising:
a remote utility grid connected to the common bus; and
wherein the AMC is further configured to:
determine an operating cost associated with each cost function and an operating cost of the utility grid,
compare an aggregate operating cost of the plurality of power source with the operating cost of the utility grid, and
selectively distribute the power demand of the load to the utility grid based on the comparison.

16. A method for operating a micro-grid system, the system including a plurality of power sources each configured to selectively supply power to a common bus, the plurality of power sources including at least one genset and at least one ESU, and an AMC operatively coupled to the plurality of power sources, the method comprising:
determining a DPL between the at least one ESU and a load connected to the common bus;
determining a CPL between the at least one ESU and the at least one genset,
determining a genset cost function associated with the at least one genset, wherein the genset cost function is based on at least an efficient load factor,
determining an ESU cost function associated with the at least one ESU, wherein the storage cost function is based on the DTL, the CTL, and thermal loss,
assigning a priority to the at least one ESU and the at least one genset based on the corresponding cost function;
selectively activating power sources based on the determined priority and a power demand of the load; and
distributing a power demand of the load connected to the common bus to the activated power source.

17. The method of claim 16, further including:
determining a cascade of ESU's and a cascade of gensets based on the assigned priority;
determine the power demand of the load and a power demand of a reserve;
determine an available reserve among the activated power sources; and
distribute the power demand of the load among the activated power sources and apportion the power demand of the reserve among the available reserve of activated power sources.

18. The method of claim 16, further including:
determining an unutilized available reserve power of the activated power sources; and
redirecting the unutilized available reserve power to an ESU based on the assigned priority until an optimal charge limit threshold is reached.

19. The method of claim 17, wherein the DPL loss is determined based on power loss between each ESU and the load during a discharge cycle, and the CTL is determined based on power loss between each ESU and each genset during a charge cycle.

20. The method of claim 17, further including:
determining an operating cost associated with each cost function and an operating cost of the utility grid;
comparing an aggregate operating cost of the plurality of power sources with the operating cost of the utility grid; and
selectively distributing the power demand of the load to the utility grid based on the comparison.

* * * * *